(12) United States Patent
Dinn et al.

(10) Patent No.: US 7,865,139 B2
(45) Date of Patent: Jan. 4, 2011

(54) METHOD AND SYSTEM FOR RELAYING SIGNALS FROM A MAGNETO-INDUCTIVE SYSTEM THROUGH A VOICE-BAND SYSTEM

(75) Inventors: Don F. Dinn, Dartmouth (CA); Craig Hillis, Dartmouth (CA)

(73) Assignee: Magneto-Inductive Systems Limited, Nova Scotia (CA)

( * ) Notice: Subject to any disclaimer, the term of this patent is extended or adjusted under 35 U.S.C. 154(b) by 963 days.

(21) Appl. No.: 11/687,530

(22) Filed: Mar. 16, 2007

(65) Prior Publication Data

US 2008/0227390 A1 Sep. 18, 2008

(51) Int. Cl.
*H04B 5/00* (2006.01)
(52) U.S. Cl. .................. 455/41.1; 455/41.2; 455/72; 455/502; 367/131; 367/142; 367/904; 340/850
(58) Field of Classification Search ............... 455/41.1, 455/41.2, 72, 502, 96, 98; 367/131, 142, 367/904, 901; 340/850
See application file for complete search history.

(56) References Cited

U.S. PATENT DOCUMENTS

| | | | |
|---|---|---|---|
| 6,058,071 A * | 5/2000 | Woodall et al. ............... 367/3 |
| 6,185,264 B1 | 2/2001 | Gashus | |
| 6,253,679 B1 * | 7/2001 | Woodall et al. ............ 102/221 |
| 6,333,723 B1 | 12/2001 | Locke | |
| 6,720,838 B2 | 4/2004 | Locke | |
| 6,882,236 B2 | 4/2005 | Dinn et al. | |
| 7,183,673 B2 | 2/2007 | Dinn et al. | |
| 7,245,876 B2 * | 7/2007 | Hessel ....................... 455/41.1 |
| 7,310,286 B1 * | 12/2007 | Jarvis et al. ................. 367/134 |
| 7,711,322 B2 * | 5/2010 | Rhodes et al. ................ 455/40 |

* cited by examiner

*Primary Examiner*—Yuwen Pan
(74) *Attorney, Agent, or Firm*—Novak Druce & Quigg LLP (57) ABSTRACT

A system and method for relaying signals from a magneto-inductive system, which are normally used to communicate between magneto-inductive units using quasi-static magnetic fields, over a voice-band communication system. The magneto-inductive signals are modulated data signals having a carrier frequency typically between 300 Hz and 3 kHz. The voice-band communication system facilitates long distance communication of voice-band signals. By supplying the signals from one magneto-inductive unit to the voice-band communication system through an analog input port, the signals are transmitted through the voice-band communication system. They are output from the system through an analog audio output port to the other magneto-inductive unit.

26 Claims, 6 Drawing Sheets

METHOD AND SYSTEM FOR RELAYING SIGNALS FROM A MAGNETO-INDUCTIVE SYSTEM THROUGH A VOICE-BAND SYSTEM

FIELD OF THE INVENTION

The present invention relates to magneto-inductive systems and, in particular, to methods and systems for relaying signals from a magneto-inductive system through systems designed for voice-band communication.

BACKGROUND OF THE INVENTION

Wireless electronic communications encounter particular difficulties in certain types of environments or situations. In urban environments, reflections and multi-path are problematic. In underwater or underground environments, signal attenuation presents a particular problem for RF signals. In military applications, signal interception and signal jamming are significant concerns with RF communications.

Accordingly, wireless communications systems have been developed that relay upon magneto-inductive technology. Magneto-inductive communications use quasi-static low frequency, AC magnetic fields. A quasi-static magnetic field differs from an electromagnetic field in that the electric field component is negligibly small. A quasi-static magnetic field does not propagate as an electromagnetic wave, but instead arises through induction. Accordingly, a quasi-static magnetic field is not subject to the same problems of reflection, refraction or scattering that radio frequency electromagnetic waves suffer from, and may thus communicate through various media (e.g. earth, air, water, ice, etc.) or medium boundaries.

Typical magneto-inductive (MI) systems include a magneto-inductive transmitter and a magneto-inductive receiver, and operate in the range of a few hundred Hz to 10 kHz. More typically, the operating frequency of an MI system is in the range of 500 to 3000 Hz.

MI systems find application in undersea operations, mining, military, and other such fields. By way of example, U.S. Pat. No. 6,253,679 to Woodall et al. describes a specific magneto-inductive remote triggering system for line charges used in amphibious assaults. MI systems may also be used for other wireless communications purposes, including, in some cases, the transmission voice data for person to person communications.

A practical limitation of MI systems is that the range of MI transmissions is relatively short compared with RF systems. Some MI systems, with sufficient power and sufficiently large antennas, may achieve effective ranges of several kilometers; however, many MI systems have a range of a few hundred meters. There are circumstances in which it would be advantageous to communicate the coded signals for an MI system over a longer range.

SUMMARY OF THE INVENTION

The present application describes systems and methods for relaying encoded-modulated signals from a magneto-inductive (MI) transmitter over a voice-band communication system. The MI system signals are modulated data signals having a carrier frequency within the voice bandwidth of telephone and two-way radio equipment. Such voice-band communication system enables long distance communication of signals in the audio frequency band. By supplying the encoded-modulated signals from one magneto-inductive unit to the voice-band communication system through an analog input port (e.g., the microphone input jack), the signals from the MI system are sent through the voice-band communication system. They are output from the system through an analog output port (e.g., the head-phone jack) to the other magneto-inductive unit.

In one aspect, the present application describes a method of transmitting a data signal for use in a magneto-inductive system. The magneto-inductive system includes a first magneto-inductive unit and second magneto-inductive unit, the first magneto-inductive unit including a transmit module for modulating said data signal at a carrier frequency to generate a modulated data signal. The method includes the steps of inputting the modulated data signal from the magneto-inductive transmitter to a voice-band communication system as an analog input, transmitting the modulated data signal over a voice-band communication channel to a remote unit, receiving the modulated data signal in the remote unit, and outputting the modulated data signal from the remote unit to the magneto-inductive receiver. The voice-band communication system has a bandwidth for audio signals in a predetermined frequency range and the carrier frequency is a frequency within the predetermined frequency range In another aspect, the present application provides a system for transmitting a data signal. The system includes a first magneto-inductive unit having a transmit module for modulating said data signal at a carrier frequency to generate and output a modulated data signal. The system also includes a first voice-band communications unit having an analog input port for receiving said modulated data signal from the first magneto-inductive unit and being configured to transmit said modulated data signal over a voice-band communications channel, a second voice-band communications unit configured to receive and output said modulated data signal, and a second magneto-inductive unit having an input port for receiving said modulated data signal from the second voice-band communications unit. The voice-band communications units have a bandwidth for audio signals in a predetermined frequency range and the carrier frequency is a frequency within the predetermined frequency range In yet a further aspect, the present application provides magneto-inductive unit for transmitting a data signal. The magneto-inductive unit includes a controller, an antenna port adapted to be connected to a magneto-inductive transmit antenna, a transmit module for modulating said data signal at a carrier frequency to generate and output a modulated data signal to said antenna port, and a coupling circuit connected to said antenna port for attenuating said modulated data signal and adapted to be connected to an analog input port of a voice-band communication unit. The voice-band communication unit has a bandwidth for audio signals in a predetermined frequency range and the carrier frequency is a frequency within the predetermined frequency range.

Other aspects and features of the present application will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present application, and in which.

Similar reference numerals are used in different figures to denote similar components.

DESCRIPTION OF SPECIFIC EMBODIMENTS

Figure 1:
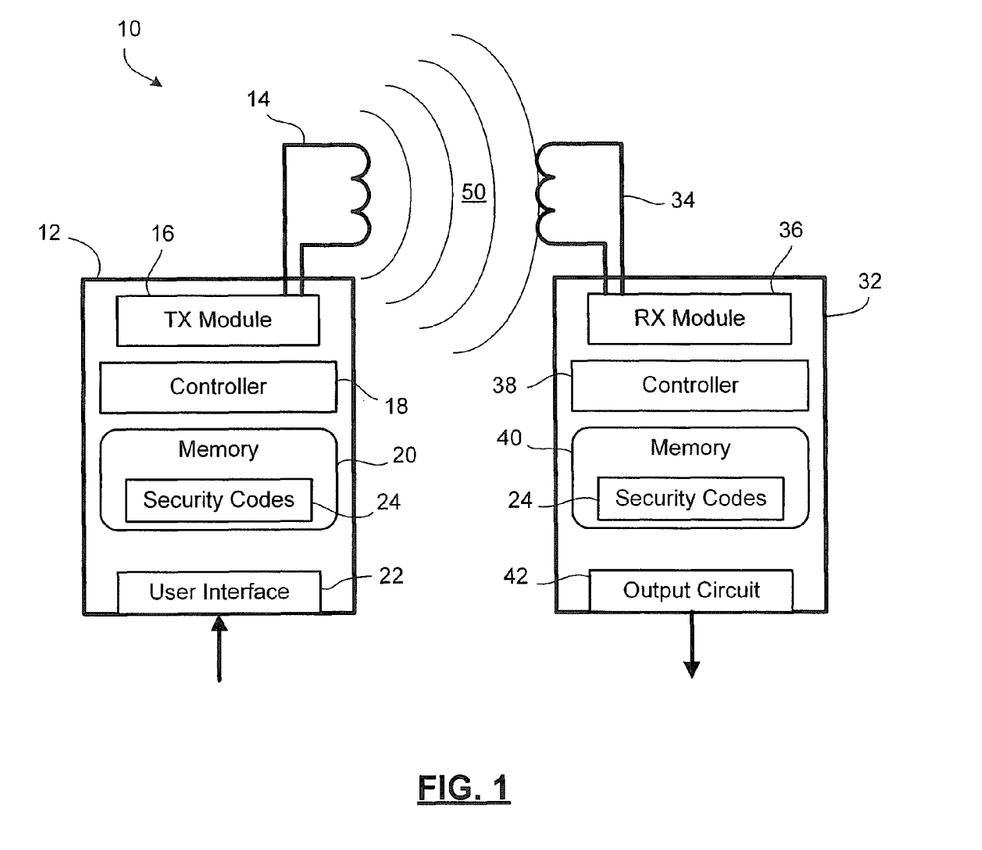
FIG. 1 diagrammatically shows an example embodiment of an MI system.

Reference is first made to FIG. 1, which diagrammatically shows an example embodiment of an MI system 10. The MI system 10 includes an MI transmitter 12 and an MI receiver 32.

The MI transmitter 12 includes a transmit antenna 14. In one example embodiment, the transmit antenna 14 may include a single loop of wire; however, in other embodiments the transmit antenna 14 includes multiple turns. In some embodiments, the transmit antenna 14 may include multiple strands forming coils that are switchable between serial and parallel connections to change the characteristics of the antenna, such as is described in U.S. Pat. No. 6,333,723 to Locke, owned in common herewith. This is most useful if the MI transmitter 12 is configured to act as a transceiver, with both transmit and receiver capability. In the embodiment shown in FIG. 1, the MI transmitter 12 does not include a receive capability; however it will be appreciated that the present application is not limited to this embodiment. The contents of U.S. Pat. No. 6,333,723, are incorporated herein by reference.

The MI transmitter 12 also includes a transmitter module 16, a controller 18, a memory 20 and a user interface 22. The transmitter module 16 generates a drive signal for powering the antenna 14 and performs modulation of a data signal supplied by the controller 18 with the drive signal. The drive signal, or carrier signal, in one example is a square wave at or about the resonant frequency of the transmit antenna 14, which is below 10 kHz. The drive frequency is typically between 300 Hz and 3000 Hz. Other AC drive signals may be used in other embodiments, including sinusoids, etc. The data signal may include a command, code, or other digital data, supplied by the controller 18 to the transmitter module 16.

The controller 18 controls the operation of the transmitter module 16 and receives data input through the user interface 22 or provides data output to the user interface 22. The controller 18 may access the memory 20 to retrieve data, or, in some cases, to store data. For example, in some cases, the controller 18 may buffer data input through the user interface 22, such as audio data, prior to transmission of the audio data via the transmitter module 16. In other cases, the controller 18 may read data stored in the memory, such as firing or arming command sequences or codes, and may send the read data to the transmitter module 16 for transmission. For example, in one embodiment, security codes 24 may be stored in the memory 20. The security codes 24 may be sent together with arming or firing commands and may be used by a receiving device as a mechanism for authenticating an incoming arming or firing command. Depending on the embodiment, the memory 20 may include random access memory (RAM), flash memory, or read-only memory (ROM).

The controller 18 may be implemented by way of a suitably programmed microcontroller or microprocessor. Software control of the controller 18 may be by way of operating programs stored in local memory, such as memory 22, or firmware within the MI transmitter 12.

The user interface 22 may, in various embodiments, include readouts or display screens for presenting data to a user; keypads, keyboards, pushbuttons, or other user input devices; a microphone for inputting audio signal and/or a microphone for outputting audio signals. The precise nature of the user interface 22 depends, in part, on the intended application for the MI system 10. For example, in the case of a remote triggering application for a mining explosive, the user interface 22 may include a simple display or readout, or other visual status indicators, such as LED lights, and may include simple input devices, such as pushbuttons or keys for arming and firing the explosive device. Other examples will be apparent to those skilled in the art.

The transmitter module 16 may use, for example, FM modulation; although, other modulation techniques are possible. In one specific example, the transmitter module 16 uses a continuous-phase frequency shift keyed (FSK) modulation technique to modulate the carrier signal with the data signal. In some embodiments, the bandwidth of the FSK modulated signal may be up to 1200 Hz around the carrier or drive frequency. Other modulation techniques, such as amplitude modulation or phase shift keying, may be used in particular embodiments. In typical embodiments, the data rate may vary up to 2400 bits per second dependent on the drive signal frequency and the requirements of a particular application. For example, in a high accuracy application, such as munitions or explosives remote triggering, robust low data rates may suffice, such as 5-20 bits/sec. Applications that transmit audio signals require high data rates, like 2400 bits/sec.

The transmitter module 16 modulates the drive or carrier signal with the data signal to generate a modulated data signal. The modulated data signal is used to drive the transmit antenna 14. The transmit antenna 14 generates a quasi-static magnetic field 50 based on the modulated data signal.

The MI receiver 32 includes a receive antenna 34. As with the transmit antenna 14, the receive antenna 34 may include a single loop, multiple turns of a loop or magnetic-material-cored coil antenna, or a switchable antenna. The receive antenna 34 is not necessarily physically identical to the transmit antenna 14, although it is tuned to the same approximate resonant frequency, i.e. the carrier or drive frequency.

The quasi-static magnetic field 50 generated by the transmit antenna 14 induces a received signal in the receive antenna 34. The received signal is input to a receiver module 36, which may perform filtering and amplification, and may demodulate the received signal to recover the data signal.

The MI receiver 32 also includes a controller 38 and memory 40. The controller 38 receives the demodulated data signal recovered from the received signal by the receiver module 36. In response to the data signal, the controller 38 may take various actions in accordance with its operating program and the contents of the data signal. In one embodiment, the controller 38 may compare the data signal with data stored in the memory 40 to validate the received command. The data stored in memory 40 may include the security codes 24. In a remote triggering embodiment, reception of the data signal may cause the controller 38 to takes steps in an arming/firing sequence.

The MI receiver 32 includes an output circuit 42. The nature of the output circuit 42 may depend on the application for which the MI system 10 is intended. For example, in a remote triggering embodiment, the output circuit 42 may include a high energy pulse generation circuit for generating a large output current pulse to detonate an explosive device under commands from the controller 38. In some applications, the output circuit 42 may include a speaker device for outputting audio. In various applications, the output circuit 42 may include a display or screen, indicator lights, or other visual output devices, as will be appreciated by those of ordinary skill in the art.

Figure 2:
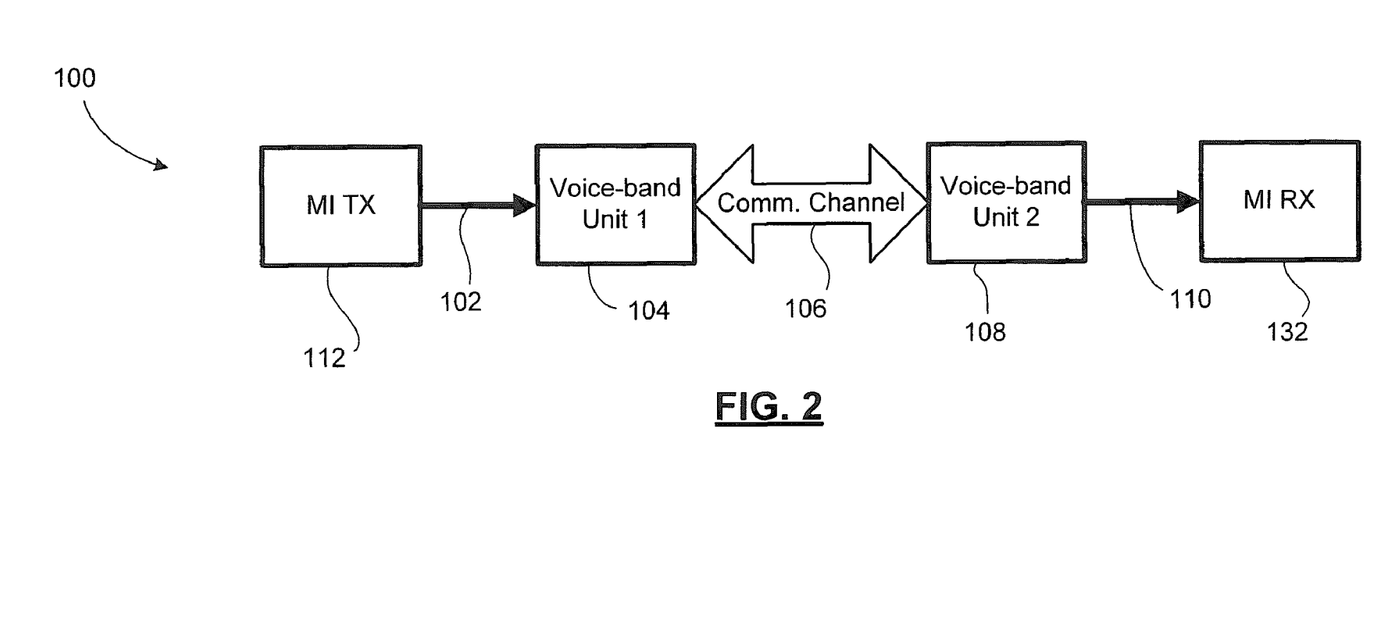
FIG. 2 shows, in block diagram form, a system for relaying signals from an MI system.

Reference is now made to FIG. 2, which shows, in block diagram form, a system 100 for relaying signals from an MI system. The system 100 includes an MI transmitter 112 and an MI receiver 132. In some embodiments, the MI transmitter 112 and MI receiver 132 may be transceivers capable of both transmitting and receiving functions; however, for the purposes of this example embodiment, they are described as having transmit or receive capability only.

The system 100 also includes a first voice-band unit 104 and a second voice-band unit 108. The voice-band units 104 and 108 are part of a voice-band communication system. The voice-band communication system is a system for connecting two units for the transmission or reception of voice-band signals. The voice-band communication system may be wired, such as the public-switched telephone network (PSTN), or wireless. It may send signals over a radio link, a circuit-switched network, a packet-switched network, or over any other type of channel or link.

The voice-band communication system and the voice-band units 104 and 108 are designed to permit voice-band communications. Accordingly, a voice-band communication channel 106 is established between the units 104 and 108 to enable encoded audio transmissions. The channel 106 may be a point-to-point connection or a virtual connection. The channel 106 may be established over one or more networks, some of which may be wired or wireless. In one example embodiment, the voice-band communication system is the conventional PSTN, and the units 104 and 108 are telephone sets. In another example, the voice-band communication system is a wireless mobile system, and the units 104 and 108 are mobile devices. In yet another example, the voice-band communication system is a packet-switched network, such as the Internet, configured for voice-over-IP (VoIP), and the units 104 and 108 are VoIP-enabled devices. In a further example, the voice-band communication system is a satellite-based telephony system and the units 104 and 108 are mobile satellite phones. In yet a further example, the voice-band communication system is a tactical radio system, and the units 104 and 108 are tactical radio units, such as Multi-band Intra-Team Handheld Radios (MBITRs). In one embodiment, the radios may be configured to operate in accordance with the next-generation Joint Tactical Radio System (JTRS) currently under development. Other examples will be appreciated by those of ordinary skill in the art.

The voice-band communication system is specifically designed to transmit or carry voice-band signals. The first voice-band unit 104 includes at least a microphone for receiving audio input and the second voice-band unit 108 includes at least a speaker for providing audio output. The voice-band communication system is configured for transmitting voice-band signals between the units 104, 108. In some cases, the voice-band communication system may employ AM or FM modulation for sending analog voice-band signals over an RF radio link. In another example, the input voice-band signals may be digitized and encoded for transmission. In different embodiments, various modulation, encoding, and transmission schemes may be used, as will be understood by those skilled in the art. For example, in a narrowband speech encoding scheme, only frequencies in the 400 Hz to 3500 Hz band are encoded, thereby transmitting a sufficiently significant portion of the human audible spectrum to enable intelligible speech reception. Other encoding schemes may attempt to preserve additional qualities of the speech that may be reflected in higher frequencies. Some voice-band communication systems, like many PSTN systems, employ A-law algorithm or μ-law algorithm encoding schemes. Some use Code-Excited Linear Predictive (CELP) coding.

It will be appreciated that the voice-band communication system is designed to transmit voice or audio signals that fall within a predetermined frequency range. In one embodiment, the predetermined frequency range is between 300 Hz and 3 kHz, although the present application is not limited to this range. In general, the voice-band communication system is designed to transmit a frequency range that includes at least a portion of the human audible spectrum. Advantageously, the modulated data signals used in typical MI systems 10 typically fall within the human audible frequencies. In particular, the carrier frequency used in typical MI systems falls within the range of frequencies transmitted by typical voice-band communication systems, e.g. below 10 kHz, and in some embodiments, between 300 Hz and 3 kHz.

Referring still to FIG. 2, the MI transmitter 112 generates a modulated data signal 102 at the drive frequency. Rather than using the modulated data signal 102 to drive a transmit antenna, the MI transmitter 112 is connected to an analog input port on the first voice-band unit 104 and the modulated data signal 102 is input to the analog input port. The analog input port may be, for example, a microphone input port. The analog input port is a signal source for the voice-band communication system, meaning that voice-band signals input through the analog input port are transmitted over the voice-band communication channel 106 to the second voice-band unit 108, where they are received and output. The MI receiver 132 is connected to an analog output port on the second voice-band unit 108. The analog output port may be, for example, a speaker or headphone output port. The analog output port outputs a voice-band signal 110, which is derived from the signals received over the communication channel 106. Instead of receiving data via its receive antenna, the MI receiver 132 receives the voice-band signal 110 from the analog output port of the second voice-band unit 108.

This configuration permits an MI transmitter 112 to send its encoded signals to the MI receiver 132 over great distances using the long distance communication provide by the voice-band communication system, thereby extending the range of the MI system 10 (FIG. 1). Advantageously, the transmission or encoding scheme used by the voice-band communication system is not relevant to operation of the MI system provided that the signals from the MI transmitter 112 are recoverable by the MI receiver 132. From the point of view of the voice-band communication system, the signals from the MI transmitter 112 appear to be voice-band signals, such as speech or other audio signals. The voice-band communication system operates as it would normally in transmitting speech or other audio signals. This means that any voice-band communication system can be used to relay the signals from the MI transmitter 112, provided that the voice-band communication system can accept an analog voice-band input and provide an analog voice-band output.

It will be understood that the use of a voice-band communication system to send signals from an MI system eliminates some advantages of using MI signals, such as the ability to penetrate water, earth, rock, etc., and any such limitations of the voice-band communication system are still relevant. Nevertheless, situations may arise in the use of MI systems in which it is desirable to transmit the signals from an MI transmitter to an MI receiver over great distances and for which a quasi-static magnetic field is not necessary. Moreover, MI systems may be chained together to provide for the use of MI technology at one point in the communications link to communicate in a difficult environment, while still enabling long distance communication, as will be described further below.

Figure 3:
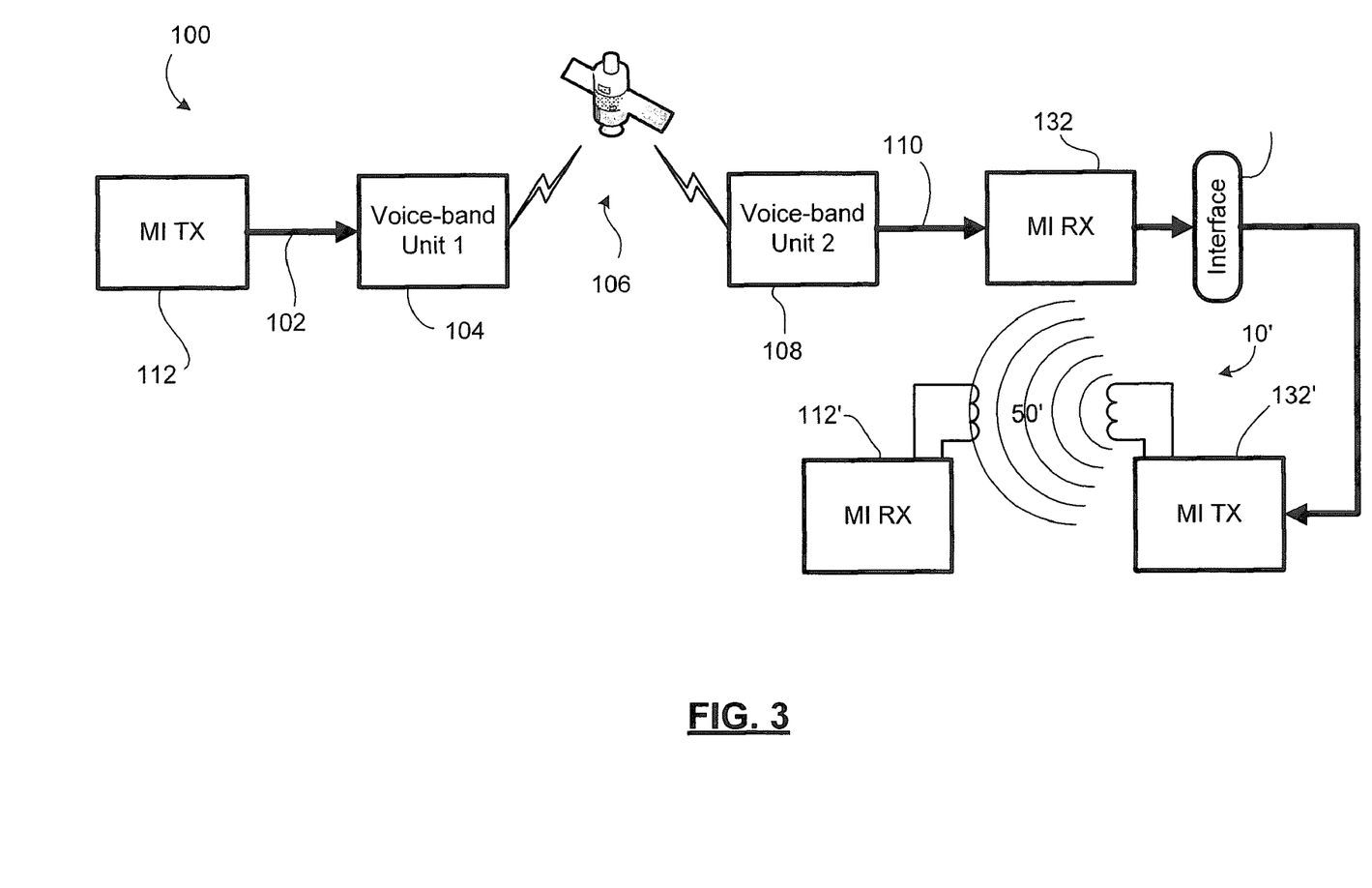
FIG. 3 shows, in block diagram form, an example embodiment of an extension of the system for relaying signals from an MI system.

Reference is now made to FIG. 3, which shows, in block diagram form, an example embodiment of an extension of the system 100 for relaying MI signals.

The system 100 includes the MI transmitter 112 and the MI receiver 132 linked together by way of a voice-band communication system, which includes the first voice-band unit 104, the second voice-band unit 108, and the voice-band communication channel 106, which in this illustration is pictured as a satellite link. Through an interface device 150, the MI receiver 132 is connected to a second MI system 10'. The second MI system 10' includes MI transmitter 112' and MI receiver 132'. The interface device 150 permits the MI receiver 132 to send commands or instructions to the MI transmitter 112', which then sends commands or instructions to the MI receiver 132' by way of a quasi-static magnetic field 50'.

The interface device 150 connects the MI receiver 132 to the MI transmitter 112'. The nature of the interface device 150 will depend on the particular MI system and its application. The function of the interface device 150 is to ensure that the output from the MI receiver 132 resulting from the command or instruction from the MI transmitter 112 is detected and an appropriate input is supplied to the MI transmitter 112' such that it causes a similar command or instruction to be sent to the MI receiver 132'. In the case of an audio communication, the interface device 150 may be as simple as connecting an audio output on the MI receiver 132 with an audio input on the MI transmitter 112' and ensuring that the MI transmitter 112' sends the audio over the MI channel to the MI receiver 132'.

In another embodiment, the system 100 may be intended for sending an arm or fire command that causes output of a high energy firing pulse. Accordingly, the command or instruction relayed from the MI transmitter 112 through the voice-band communications channel 106 to the MI receiver 132 may result in the output of a firing pulse from the MI receiver 132. In such an embodiment, the interface device 150 may be configured to act as a sink for the firing pulse and, upon detecting the firing pulse, input signals to the MI transmitter 112' to cause it to transmit a firing command to the MI receiver 132', thereby causing it to generate and output a firing pulse.

In other embodiments, the MI receiver 132 may feature an auxiliary output from which the interface device 150 may obtain an auxiliary signal indicative of the command or instruction received from the MI transmitter 112. For example, the auxiliary signal may indicate the MI receiver 132 status, such as 'armed', etc., and the interface device 150 may thus input instructions to the MI transmitter 112' to cause it to send corresponding commands or instructions to the MI receiver 132' so as to place the MI receiver 132' in the same state as the MI receiver 132.

The precise design and operation of the interface device 150 is dependent on the specific MI system used. The suitable selection or design of the interface device 150 for a given MI system will be within the skill of an ordinary person in the art field.

Referring again to FIGS. 2 and 3, the MI transmitter 112 supplies the modulated data signal 102 to the first voice-band unit 104. Similarly, the MI receiver 132 receives the voice-band signal 110 from the second voice-band unit 108.

In particular, in one embodiment the antenna port of the MI transmitter 112 is disconnected from the transmit antenna 14 (FIG. 1), which is not used when relaying the MI signals over the voice-band communication system. The antenna port of the MI transmitter 112 is connected to an analog audio input port of the first voice-band unit 104, such as a microphone input jack. Similarly, the antenna port of the MI receiver 132 is disconnected from the receive antenna 34 (FIG. 1) and is connected to an analog audio output port of the second voice-band unit 108, such as a speaker output jack.

The connectors coupling the audio ports with the antenna ports may, in some embodiments, include coupling circuitry for attenuating, biasing, filtering, or otherwise conditioning the modulated data signal 102 or voice-band signal 110. The specific coupling circuitry used in any particular embodiment is dependent on the characteristics of the MI system and of the voice-band units 104 and 108. In some instance, no coupling circuitry may be required other than connecting wires.

Figure 4:
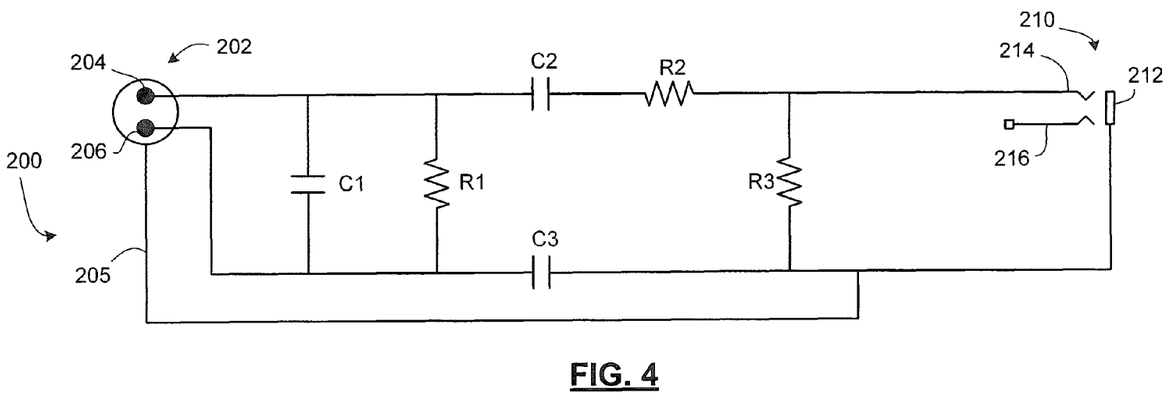
FIG. 4 shows an example embodiment of a passive coupling circuit for the MI transmitter.

Reference is now made to FIG. 4, which shows an example embodiment of a passive coupling circuit 200 for the MI transmitter 112 (FIG. 2). The coupling circuit 200 includes a transmit antenna connector 202, which is a connector adapted for connecting to the transmit antenna port on the MI transmitter 112. In particular it includes a positive signal pin 204 and a negative signal pin 206. The modulated data signal at the carrier frequency is input across the pins 204, 206. The connector 202 also includes a MI transmitter ground point 205.

The coupling circuit 200 also includes a first voice-band unit analog input port 210, which in this embodiment is illustrated as a TRS jack. Other types of analog input ports may be used in other embodiments.

The input modulated data signal from pins 204 and 206 is AC coupled through capacitors C2 and C3 to a voltage divider formed by resistors R2 and R3. The attenuated modulated data signal produced by the voltage divider of R2/R3 is then input to the analog input port 210. In this embodiment the analog input port 210 is a three-conductor stereo phono jack, i.e. a TRS jack, having a tip 214, ring 216, and shield 212. In the example voice-band unit providing the analog input port 210 in this embodiment the tip 214 is used as an analog microphone input port and the ring 216 is used as an analog mono audio output port. The shield 212 is a signal ground connection. Accordingly, the attenuated modulated data signal is input to the tip 214 and the ring 216 is left unconnected. The shield 212 is connected to the MI transmitter ground point 205 and, through AC coupling capacitor C3, to negative signal pin 206.

Capacitor C1 and resistor R1 are connected across the positive signal pin 204 and negative signal pin 206. They provide some low pass filtering of the modulated data signal. Resistor R1 also closes the DC loop between the pins 204, 206 that would normally be present if the transmit antenna 14 (FIG. 1) were connected to the transmit antenna connector 202.

It will be appreciated that the attenuation of the R2/R3 voltage divider is required due to the high output voltage of the drive signal normally used to drive the transmit antenna 14. The input port 210 of the voice-band unit is not usually capable of handling the magnitudes associated with the drive signal without damage, or at least clipping of the signal. The resistor values may be selected based on the drive voltage and input port signal requirements of any particular implementation, as will be appreciated by those skilled in the art.

Figure 5:
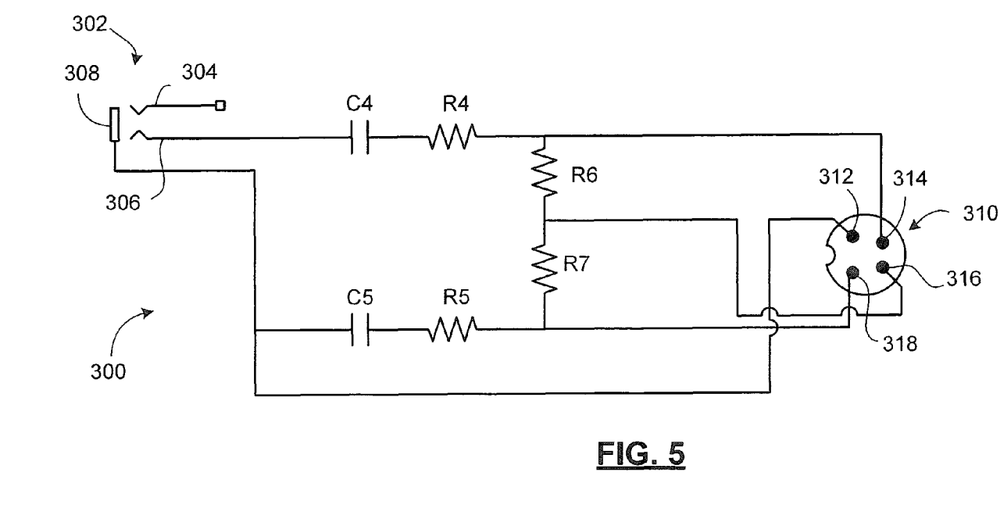
FIG. 5 shows an example embodiment of a passive coupling circuit for the MI receiver.

Reference is now made to FIG. 5, which shows an example embodiment of a passive coupling circuit 300 for the MI receiver 132 (FIG. 2). The passive coupling circuit 300 includes a second voice-band unit analog output port 302, which in this embodiment is illustrated as a TRS jack. It also includes a receive antenna connector 310, which is a connector adapted for connecting to the receive antenna port on the MI receiver 132.

The analog output port 302 supplies the voice-band signal, which the second voice-band unit generates by recovering the communication signals received from the first voice-band unit over the communications channel. The voice-band signal output through the analog output port 302 is typically an analog electrical signal for driving a speaker, such as the earpiece of a headphone set. In the embodiment shown in FIG. 5, the analog output port is a is a three-conductor stereo phono jack, i.e. a TRS jack, having a tip 304, ring 306, and shield 308. In the example voice-band unit providing the analog output port 302 in this embodiment the tip 304 is used as an analog microphone input port and the ring 306 is used as an analog mono audio output port. The shield 308 is a signal ground connection. Accordingly, the tip 304 is left unconnected and the ring 306 supplies the decoded voice-band signal.

The receive antenna connector 310 includes system ground pin 312, signal input pins 314 and 318, and bias pin 316. In this embodiment, the MI receiver 132 (FIG. 2) first stage electronics are biased through pin 316 via the receive antenna 34 (FIG. 1). This configuration may be used in embodiments in which the MI receiver 132 has centre tapped receive antenna 34 (FIG. 1). Other embodiments of the MI receiver 132 (FIG. 2) that do not use a centre tapped antenna may not be biased through the receive antenna 34 (FIG. 1) The various alternatives will be appreciated by those of ordinary skill in the art.

The decoded voice-band signal input via ring 306 of the analog output port 302 is DC filtered (AC coupled) through capacitors C4 and C5. The bias pin 316 is connected between resistors R6 and R7 to supply the DC mid-rail bias. The resistor combinations R4/R6 and R5/R7 serve to provide whatever level of attenuation is necessary for a given implementation.

Figure 6:
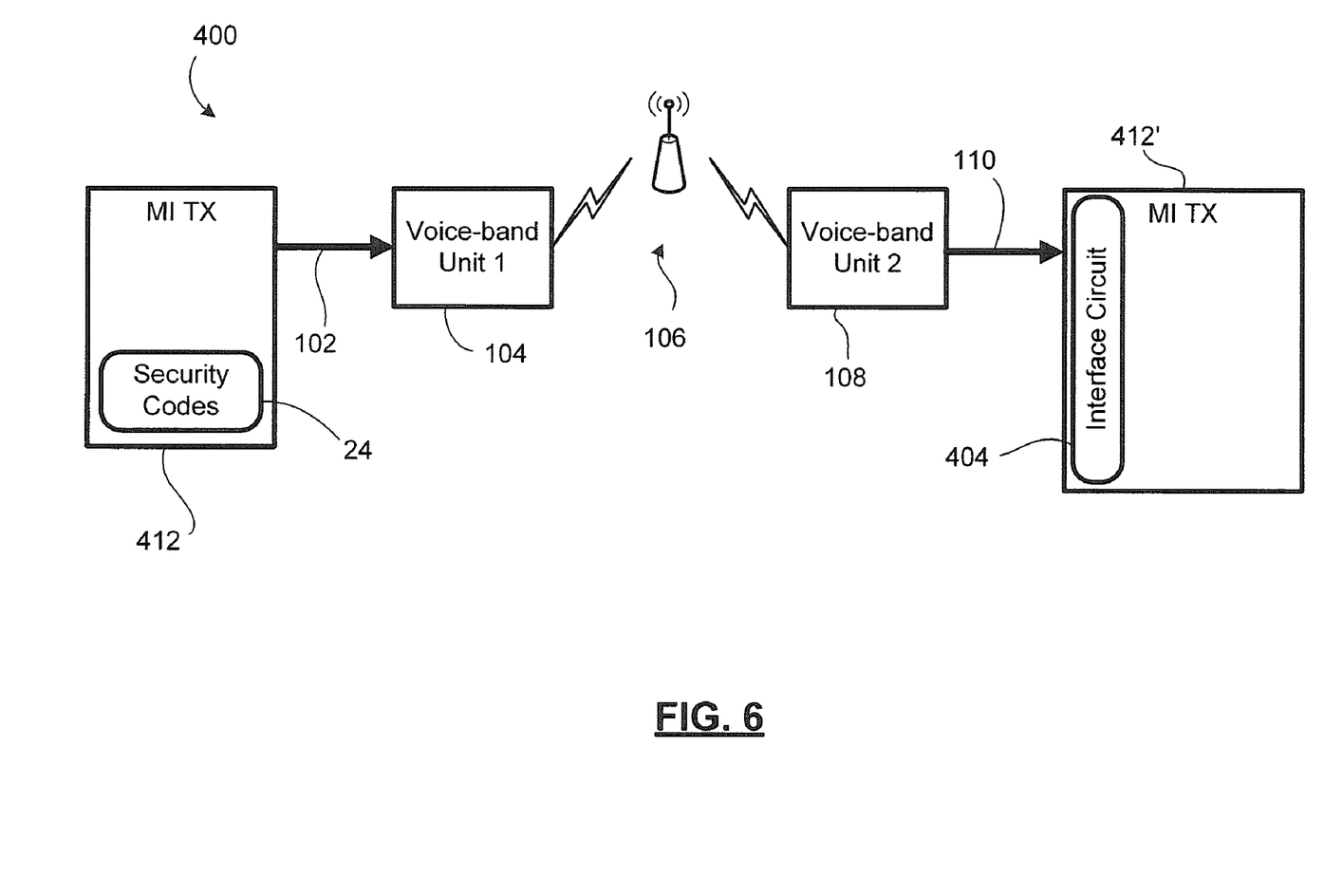
FIG. 6 shows, in block diagram form, a particular application of an example embodiment of a system for relaying signals from an MI system.

Reference is now made to FIG. 6, which shows, in block diagram form, a particular application of an example embodiment of a system 400 for relaying MI signals.

In this embodiment, the system 400 relays MI signals from a first MI transmitter 412 to a second MI transmitter 412' through first and second voice-band units 104, 108. The second MI transmitter 412' is adapted to receive input audio communications from the second voice-band unit 108. In particular, the second MI transmitter 412' includes an interface circuit 404 configured to receive the input voice-band signal 110. It will be appreciated that the interface circuit 404 includes an audio input port through which signals may be input, and suitably conditioned, before being provided to the controller 18 (FIG. 1). In this embodiment, the voice-band signal 110 is not input through an antenna connector port.

The particular application envisioned for the system 400 is the transferring of security codes 24 from the first MI transmitter 412 to the second MI transmitter 412'. This application may arise, for example, in a military context. A first team may deploy an MI remote triggered device in the field. The deployed device includes an MI receiver. The MI receiver contains security codes that correspond to the security codes of the MI transmitter held by the first team. Accordingly, only the first team is capable of successfully activating the device through an MI transmission from its MI transmitter since the MI transmission will include the correct security codes. If the first team leaves the area and a second team enters the area, there may be situations in which the first team wishes to equip the second team with the ability to activate the deployed device. Accordingly, the first team may wish to transmit the security codes to the second team so that the second team's MI transmitter can successfully communicate with the MI receiver in the deployed device. Rather than having an individual extract security codes from the first team's transmitter and communicate them, perhaps orally, to an individual on the second team, the system 400 permits the MI transmitters 412, 412' to directly communicate security codes 24. The direct transmission of security codes from the first MI transmitter 412 to the second MI transmitter 412' using voice-band communications provides some security since no individual person accesses the security codes during the transmission.

It will be appreciated that the system 400 may find utility in other applications.

Figure 7:
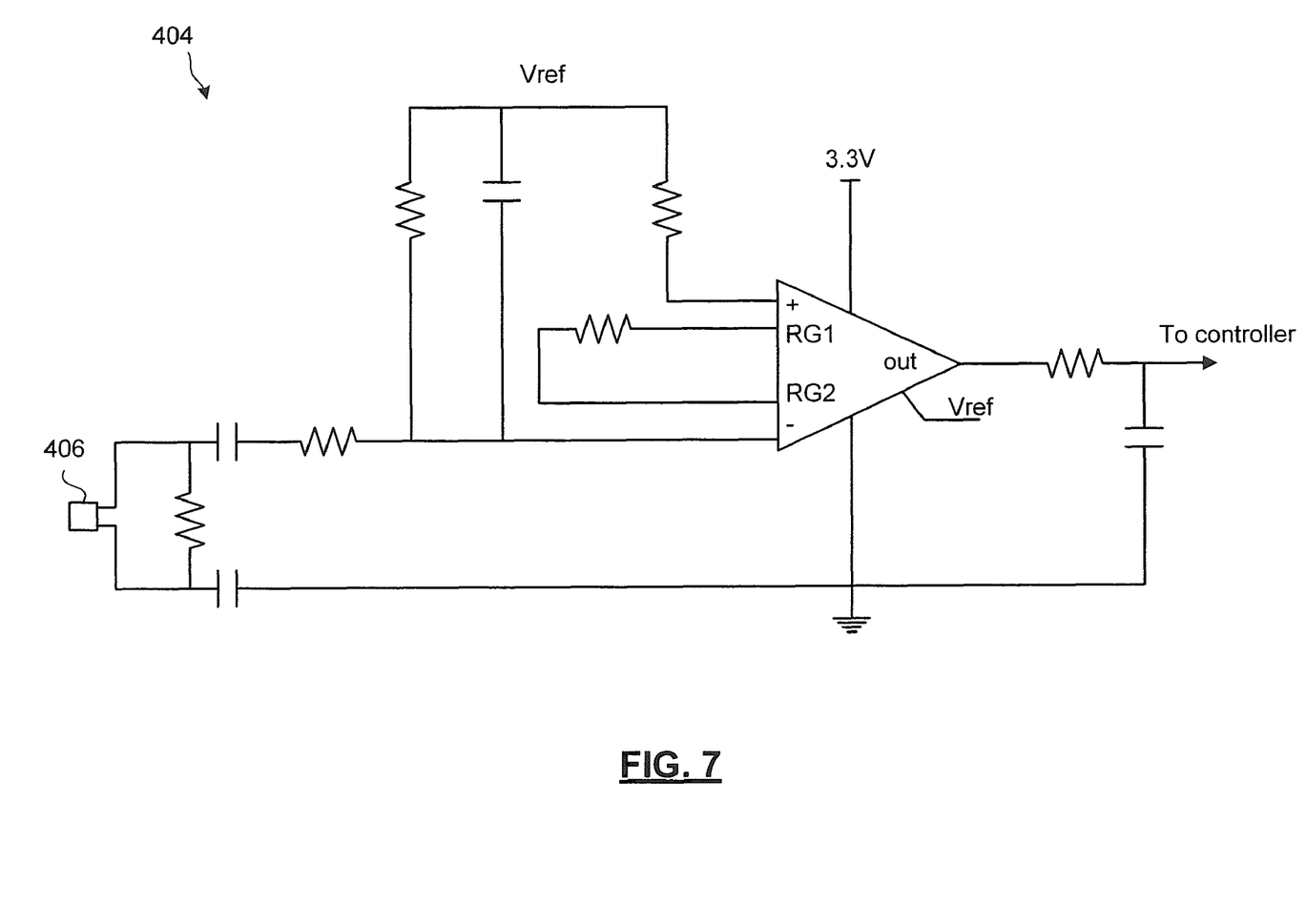
FIG. 7 shows an example embodiment of the interface circuit from FIG. 6.

Reference is now made to FIG. 7, which shows an example embodiment of the interface circuit 404 from FIG. 6. The interface circuit 404 includes an input connector 406, which is adapted to receive voice-band analog input from, for example, the second voice-band unit 108 (FIG. 6). The interface circuit 404 performs attenuation, buffering, filtering, and signal conditioning appropriate to the particular MI transmitter 412' (FIG. 6) and its controller 18 (FIG. 1). The resulting signal may be used by the controller 18 of the MI transmitter 412' to, for example, extract and store security codes 24 (FIG. 6).

Certain adaptations and modifications of the invention will be obvious to those skilled in the art when considered in light of this description. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method of transmitting a data signal for use in a magneto-inductive system, wherein the magneto-inductive system includes a first magneto-inductive unit and second magneto-inductive unit, the first magneto-inductive unit including a transmit module for modulating said data signal at a carrier frequency to generate a modulated data signal, the method comprising the steps of:
   inputting the modulated data signal from the magneto-inductive transmitter to a voice-band communication system as an analog input;
   transmitting the modulated data signal over a voice-band communication channel to a remote unit;
   receiving the modulated data signal in the remote unit; and
   outputting the modulated data signal from the remote unit to the magneto-inductive receiver,
   wherein the voice-band communication system has a bandwidth for audio signals in a predetermined frequency range and wherein the carrier frequency is a frequency within said predetermined frequency range.

2. The method claimed in claim 1, wherein the first magneto-inductive unit comprises a magneto-inductive transmitter, and the second magneto-inductive unit comprises a magneto-inductive receiver.

3. The method claimed in claim 2, wherein the magneto-inductive transmitter includes an antenna output port adapted to supply the modulated data signal to a transmit antenna, and wherein the voice-band communication system includes a first unit having an analog audio input port for receiving voice-band signals, and wherein the step of inputting the modulated data signal comprises connecting the antenna output port to the analog audio input port.

4. The method claimed in claim 3, wherein said step of connecting includes coupling the antenna output port to the analog audio input port through a coupling circuit adapted to attenuate the modulated data signal.

5. The method claimed in claim 2, wherein the magneto-inductive receiver includes an antenna input port adapted to receive signals induced in a receive antenna, and wherein the voice-band communication system includes the remote unit, the remote unit having an analog audio output port for supplying voice-band analog signals, and wherein the step of outputting the modulated data signal comprises connecting the analog audio output port to the antenna input port.

6. The method claimed in claim 5, wherein said step of connecting includes coupling the analog audio output port to the antenna input port through a coupling circuit adapted to attenuate said modulated data signal.

7. The method claimed in claim 1, wherein said voice-band communication system comprises a first unit and the remote unit, and wherein said method further includes a step of establishing said voice-band communication channel between said first unit and said remote unit.

8. The method claimed in claim 7, wherein the first unit and the remote unit comprise mobile communications devices, and wherein said step of establishing includes placing a call from one of said mobile communications devices to the other of said devices.

9. The method claimed in claim 1, wherein the first magneto-inductive unit comprises a first magneto-inductive transmitter, and wherein the second magneto-inductive unit comprises a second magneto-inductive transmitter, and wherein said second magneto-inductive transmitter includes an interface circuit having an input port for receiving said modulated data signal.

10. The method claimed in claim 9, wherein said data signal comprises a security code, and wherein said method includes a step of reading said security code from a memory in said first magneto-inductive transmitter before said step of inputting, and a step of storing said security code in a memory in said second magneto-inductive transmitter after said step of outputting.

11. The method claimed in claim 1, wherein the carrier frequency comprises a frequency below 10 kHz.

12. The method claimed in claim 1, wherein said predetermined frequency range comprises about 300 Hz to about 3000 Hz.

13. A system for transmitting a data signal, comprising:
a first magneto-inductive unit having a transmit module for modulating said data signal at a carrier frequency to generate and output a modulated data signal;
a first voice-band communications unit having an analog input port for receiving said modulated data signal from said first magneto-inductive unit and being configured to transmit said modulated data signal over a voice-band communications channel;
a second voice-band communications unit configured to receive and output said modulated data signal; and
a second magneto-inductive unit having an input port for receiving said modulated data signal from said second voice-band communications unit,
wherein the voice-band communications units have a bandwidth for audio signals in a predetermined frequency range and wherein the carrier frequency is a frequency within said predetermined frequency range.

14. The system claimed in claim 13, wherein the first magneto-inductive unit comprises a magneto-inductive transmitter, and the second magneto-inductive unit comprises a magneto-inductive receiver.

15. The system claimed in claim 14, wherein the magneto-inductive transmitter includes an antenna output port adapted to supply the modulated data signal to a transmit antenna, and wherein said system further comprises a coupling circuit connected between said antenna output port and said analog input port.

16. The system claimed in claim 15, wherein said coupling circuit is adapted to attenuate the modulated data signal.

17. The system claimed in claim 14, wherein the magneto-inductive receiver includes an antenna input port adapted to receive signals induced in a receive antenna, said second voice-band communication unit includes an analog audio output port for outputting said modulated data signal, and wherein the system further comprises a coupling circuit connected between said analog audio output port and said antenna input port.

18. The system claimed in claim 13, wherein said first and second voice-band communication units comprise mobile communication devices, and wherein said voice-band communications channel comprises a channel associated with a call from one of said mobile communications devices to the other of said devices.

19. The system claimed in claim 13, wherein the first magneto-inductive unit comprises a first magneto-inductive transmitter, and wherein the second magneto-inductive unit comprises a second magneto-inductive transmitter, and wherein said second magneto-inductive transmitter includes an interface circuit having an input port for receiving said modulated data signal.

20. The system claimed in claim 19, wherein said data signal comprises a security code, said second magneto-inductive transmitter includes a memory, and wherein said second magneto-inductive transmitter is configured to store said security code in said memory.

21. The system claimed in claim 13, wherein the carrier frequency comprises a frequency below 10 kHz.

22. The system claimed in claim 13, wherein said predetermined frequency range comprises about 300 Hz to about 3000 Hz.

23. A magneto-inductive unit for transmitting a data signal, comprising:
a controller;
an antenna port adapted to be connected to a magneto-inductive transmit antenna;
a transmit module for modulating said data signal at a carrier frequency to generate and output a modulated data signal to said antenna port;
a coupling circuit connected to said antenna port for attenuating said modulated data signal and adapted to be connected to an analog input port of a voice-band communication unit,
wherein the voice-band communication unit has a bandwidth for audio signals in a predetermined frequency range and wherein the carrier frequency is a frequency within said predetermined frequency range.

24. The magneto-inductive unit claimed in claim 23, wherein said coupling unit is adapted to attenuate said modulated data signal.

25. The system claimed in claim 23, wherein the carrier frequency comprises a frequency below 10 kHz.

26. The magneto-inductive unit claimed in claim 23, wherein said predetermined frequency range comprises about 300 Hz to about 3000 Hz.

* * * * *